United States Patent
Zdornov et al.

(10) Patent No.: US 10,404,574 B2
(45) Date of Patent: Sep. 3, 2019

(54) DEADLOCK-FREE ROUTING IN LOSSLESS MULTIDIMENSIONAL CARTESIAN TOPOLOGIES WITH MINIMAL NUMBER OF VIRTUAL BUFFERS

(71) Applicant: Mellanox Technologies TLV Ltd., Raanana (IL)

(72) Inventors: Vladimir Zdornov, Kfar Saba (IL); Eitan Zahavi, Zichron Yaakov (IL)

(73) Assignee: Mellanox Technologies TLV Ltd., Raanana (IL)

( * ) Notice: Subject to any disclaimer, the term of this patent is extended or adjusted under 35 U.S.C. 154(b) by 169 days.

(21) Appl. No.: 15/393,284

(22) Filed: Dec. 29, 2016

(65) Prior Publication Data

US 2018/0145900 A1    May 24, 2018

Related U.S. Application Data

(60) Provisional application No. 62/426,241, filed on Nov. 24, 2016.

(51) Int. Cl.
| | |
|---|---|
| *H04L 12/733* | (2013.01) |
| *H04L 12/707* | (2013.01) |
| *H04L 12/947* | (2013.01) |
| *H04L 12/721* | (2013.01) |

(Continued)

(52) U.S. Cl.
CPC .......... *H04L 45/122* (2013.01); *H04L 45/06* (2013.01); *H04L 45/18* (2013.01); *H04L 45/22* (2013.01); *H04L 45/24* (2013.01); *H04L 45/28* (2013.01); *H04L 49/25* (2013.01)

(58) Field of Classification Search
CPC .............................. H04L 45/06; H04L 45/122
See application file for complete search history.

(56) References Cited

U.S. PATENT DOCUMENTS

| | | |
|---|---|---|
| 5,533,198 A | 7/1996 | Thorson |
| 6,918,063 B2 | 7/2005 | Ho et al. |

(Continued)

FOREIGN PATENT DOCUMENTS

| | | |
|---|---|---|
| EP | 2662778 A1 | 11/2013 |

OTHER PUBLICATIONS

Dally et al., "Deadlock-free adaptive routing in multicomputer networks using virtual channels", IEEE Transactions on Parallel and Distributed Systems, vol. 4, Issue 4, pp. 466-475, Apr. 1, 1993.

(Continued)

*Primary Examiner* — Zhensheng Zhang
(74) *Attorney, Agent, or Firm* — Kligler & Associates

(57) ABSTRACT

An apparatus includes a network interface and a processor. The network interface is configured to communicate with a network that includes a plurality of switches interconnected in a Cartesian topology having multiple dimensions. The processor is configured to predefine an order among the dimensions of the Cartesian topology, to search for a preferred route via the network from a source switch to a destination switch, by evaluating candidate routes based at least on respective numbers of switches along the candidate routes for which traversal to a next-hop switch changes from one of the dimensions to another of the dimensions opposite to the predefined order, and to configure one or more of the switches in the network to route packets from the source switch to the destination switch along the preferred route.

22 Claims, 3 Drawing Sheets

(51) Int. Cl.
  *H04L 12/705* (2013.01)
  *H04L 12/703* (2013.01)

(56) References Cited

U.S. PATENT DOCUMENTS 9,009,648 B2 4/2015 Kumar et al.
2002/0029287 A1 3/2002 Yemini et al.

OTHER PUBLICATIONS

European Application # 17202641 Search Report dated Feb. 23, 2018.

Singh et al., "Locality-Preserving Randomized Oblivious Routing on Torus Networks", Proceedings of the 14th Annual ACM Symposium on Parallel Algorithms and Architectures, pp. 9-13, Aug. 10-13, 2002.

Seitz et al., "The architecture and programming of the Ametek series 2010 multicomputer", C3P Proceedings of the 3rd Conference on Hypercube concurrent computers and applications: Architecture, software, computer systems, and general issues, vol. 1, pp. 33-36, Pasadena, USA, Jan. 19-20, 1988.

Dally et al., "Deadlock-free message routing in multiprocessor interconnection networks", IEEE Transactions on Computers, vol. C-36, issue 5, pp. 547-553, May 1987.

Glass et al., "The turn model for adaptive routing", Proceedings of the 19th annual international symposium on Computer architecture (ISCA '92), pp. 278-287, Queensland, Australia, May 19-21, 1992.

Underwood et al., "A unified algorithm for both randomized deterministic and adaptive routing in torus networks", IEEE International Symposium on Parallel and Distributed Processing Workshops and Phd Forum (IPDPSW), pp. 723-732, May 16-20, 2011.

Sancho et al., "Analyzing the Influence of Virtual Lanes on the Performance of InfiniBand Networks", Proceedings of the International Parallel and Distributed Processing Symposium,10 pages, year 2002.

Shim et al., "Static Virtual Channel Allocation in Oblivious Routing", 3rd ACM/IEEE International Symposium on Networks-on-Chip, 6 pages, May 10-13, 2009.

Domke et al., "Deadlock-Free Oblivious Routing for Arbitrary Topologies", Proceedings of the 2011 IEEE International Parallel & Distributed Processing Symposium (IPDPS '11), pp. 616-627, May 16-20, 2011.

Upadhyay et al., "Routing Algorithms for Torus Networks", International Conference on High Performance Computing, New Delhi, India, 6 pages, Dec. 27-30, 1995.

Scheideler, C., "Basic routing theory I—Oblivious routing", The Johns Hopkins University, Theory of Network Communication, Lecture 3, 8 pages, Sep. 23-25, 2002.

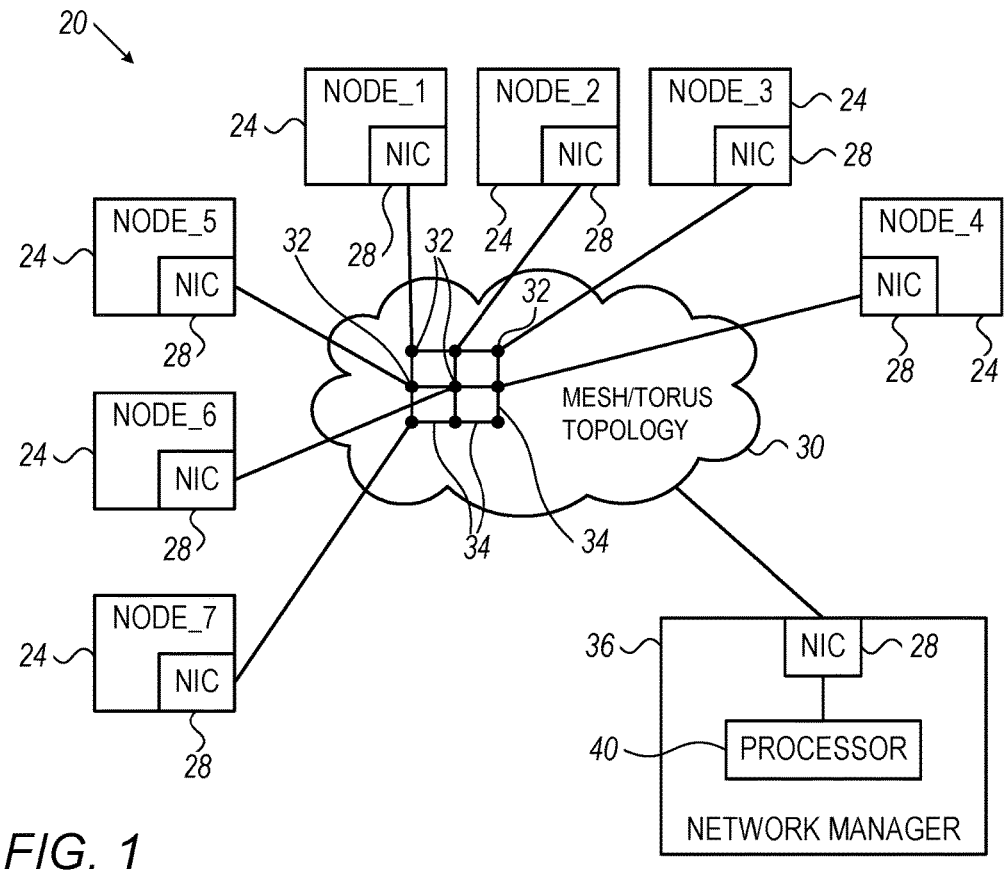
FIG. 1
FIG. 2
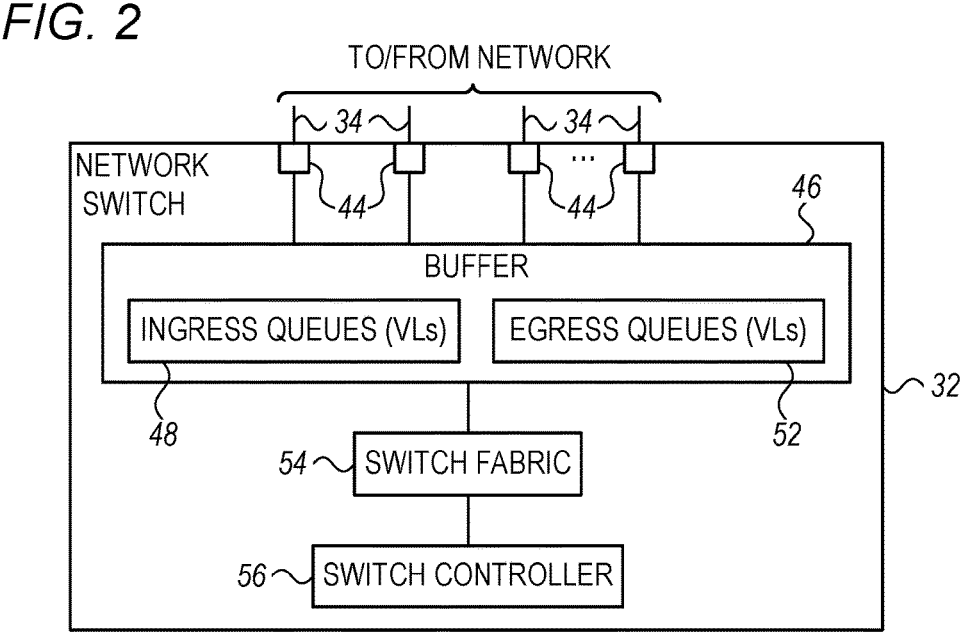

DEADLOCK-FREE ROUTING IN LOSSLESS MULTIDIMENSIONAL CARTESIAN TOPOLOGIES WITH MINIMAL NUMBER OF VIRTUAL BUFFERS

CROSS-REFERENCE TO RELATED APPLICATIONS

This application claims the benefit of U.S. Provisional Patent Application 62/426,241, filed Nov. 24, 2016, whose disclosure is incorporated herein by reference.

TECHNICAL FIELD

Embodiments described herein relate generally to network communication, and particularly to methods and systems for deadlock-free routing in lossless Cartesian topology networks.

BACKGROUND

A communication network typically comprises multiple network elements such as switches or routers interconnected with one another. The switches typically buffer incoming packets before sending the packets to a selected next-hop switch, and employ flow control measures to prevent previous-hop switches from causing buffer overflow. A deadlock condition may occur in the network, when the buffers of multiple switches having cyclic dependency become full. Deadlock conditions are likely to occur in certain network topologies such as mesh and torus topologies.

Methods for packet routing that avoid deadlock conditions are known in the art. For example, U.S. Pat. No. 9,009,648, whose disclosure is incorporated herein by reference, describes systems and methods for automatically building a deadlock free inter-communication network in a multi-core system. A high level specification is used to capture the internal dependencies of various cores, and using it along with the user specified system traffic profile to automatically detect protocol level deadlocks in the system. When all detected deadlock are resolved or no such deadlocks are present, messages in the traffic profile between various cores of the system may be automatically mapped to the interconnect channels and detect network level deadlocks. Detected deadlocks then may be avoided by re-allocation of channel resources.

U.S. Pat. No. 6,918,063, whose disclosure is incorporated herein by reference, describes a method and system for promoting fault tolerance in a multi-node computing system that provides deadlock-free message routing in the presence of node and/or link faults using only two rounds and, thus, requiring only two virtual channels to ensure deadlock freedom. A set of nodes for use in message routing is introduced, with each node in the set being used only as points along message routes, and not for sending or receiving messages.

One routing scheme for preventing deadlocks in Cartesian topologies is known as the Dimension Ordered Routing (DOR) scheme, which is described, for example, in "The architecture and programming of the Ametek series 2010 multicomputer," published in Proceedings of the third conference on hypercube concurrent computers and applications: Architecture, software, computer systems, and general issues, Volume 1, ACM, 1988, which is incorporated herein by reference. A DOR variant for torus topology is described, for example, in "Deadlock-free message routing in multiprocessor interconnection networks," IEEE Transactions on computers, Volume C-36, pages 547-553, May, 1987, which is incorporated here by reference.

SUMMARY

An embodiment that is described herein provides an apparatus that includes a network interface and a processor. The network interface is configured to communicate with a network that includes a plurality of switches interconnected in a Cartesian topology having multiple dimensions. The processor is configured to predefine an order among the dimensions of the Cartesian topology, to search for a preferred route via the network from a source switch to a destination switch, by evaluating candidate routes based at least on respective numbers of switches along the candidate routes for which traversal to a next-hop switch changes from one of the dimensions to another of the dimensions opposite to the predefined order, and to configure one or more of the switches in the network to route packets from the source switch to the destination switch along the preferred route.

In some embodiments, at a given stage of searching for the preferred route, the source switch has multiple visited neighboring switches for which preferred routes to the destination switch were already determined, and the processor is configured to select for the source switch a next-hop switch from among the visited neighboring switches based on a predefined criterion. In other embodiments, the predefined criterion specifies selecting the next-hop switch for which the candidate route via the selected next-hop switch has a shortest path among the visited neighboring switches. In yet other embodiments, the predefined criterion specifies selecting the next-hop switch for which a dimension traversed from the source switch is highest in the order among the visited neighboring switches.

In an embodiment, the processor is configured to configure the switches to allocate a number of virtual buffers per switch that is an integer multiple of a maximal number of the switches for which the traversal changes opposite to the predefined order. In another embodiment, the processor is configured to configure the switches to re-associate packets, which are received associated with a given Virtual Lane (VL) and in a next hop begin traversing a different dimension opposite to the predefined order, with a VL different from the given VL.

In some embodiments, the processor is configured to define adaptive routing rules for the switches by defining for a given ingress interface of the source switch at least two egress interfaces for routing packets from the source switch to the destination switch without exceeding a VL budget of the source switch, and to configure the switches to apply adaptive routing from the source switch to the destination switch using the at least two egress interfaces. In other embodiments, the processor is configured to define the at least two egress interfaces by considering an ingress interface and a VL value of an ingress packet, and a number of opposite-turns incurred by routing via each of the two or more egress interfaces and by the source switch. In yet other embodiments, the processor is configured to search for the preferred route while refraining from evaluating candidate routes in which at least one of the switches, or a physical link connecting two of the switches, is missing from the Cartesian topology or malfunctions.

There is additionally provided, in accordance with an embodiment that is described herein, a method, including, in a processor communicating with a network that includes a plurality of switches interconnected in a Cartesian topology having multiple dimensions, predefining an order among the dimensions of the Cartesian topology. A preferred route via the network from a source switch to a destination switch is searched by the processor, by evaluating candidate routes based at least on respective numbers of switches along the candidate routes for which traversal to a next-hop switch changes from one of the dimensions to another of the dimensions opposite to the predefined order. One or more of the switches in the network are configured to route packets from the source switch to the destination switch along the preferred route.

These and other embodiments will be more fully understood from the following detailed description of the embodiments thereof, taken together with the drawings in which:

BRIEF DESCRIPTION OF THE DRAWINGS

FIG. 1 is a block diagram that schematically illustrates a computer system, in accordance with an embodiment that is described herein;

FIG. 2 is a block diagram that schematically illustrates a network switch, in accordance with an embodiment that is described herein;

DETAILED DESCRIPTION OF EMBODIMENTS

Overview

Figure 3:
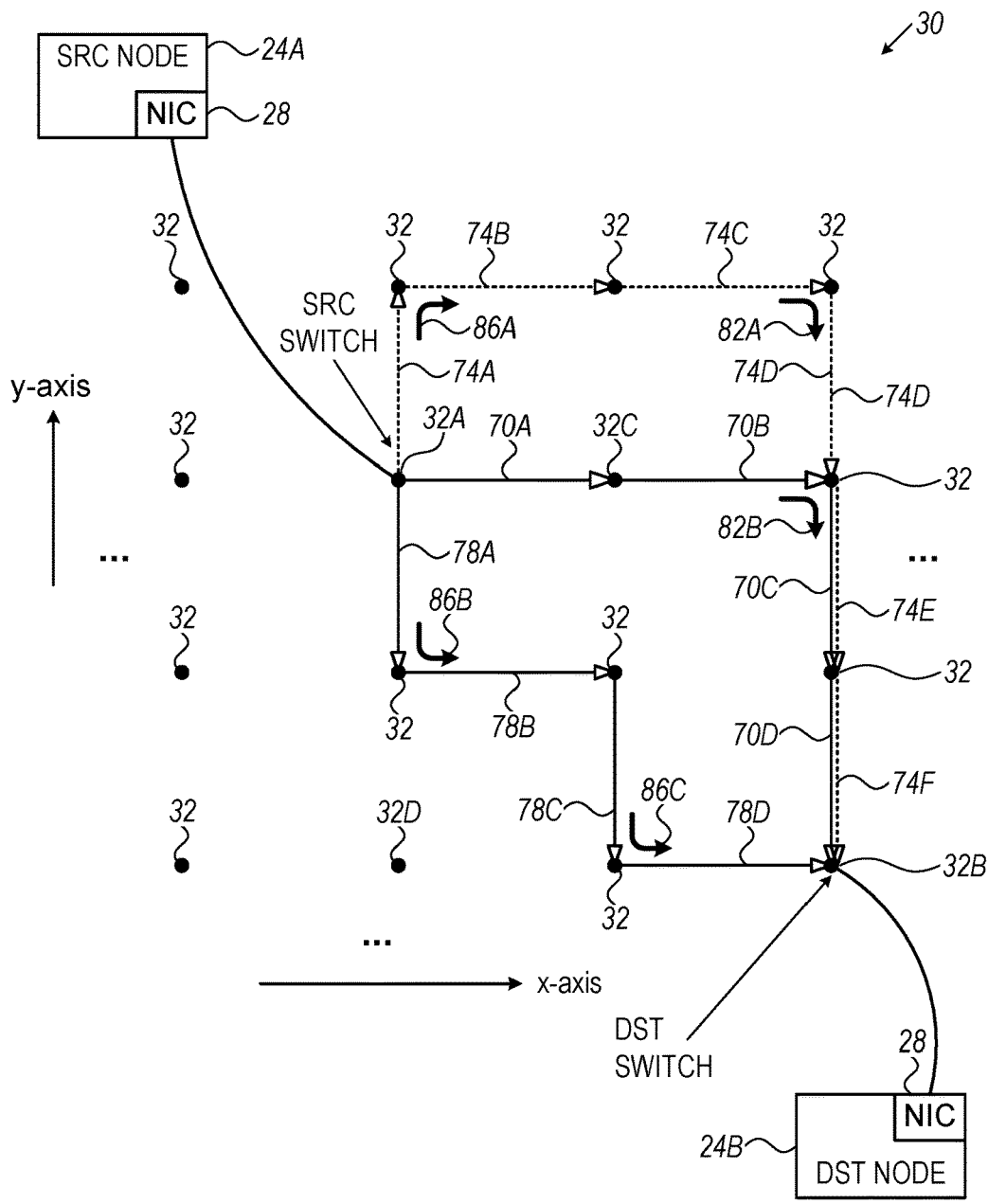
FIG. 3 is a diagram that schematically illustrates a network configured in a 2D mesh or torus topology, in which multiple alternative routes connect between selected source and destination switches, in accordance with an embodiment that is described herein.

Packets traversing a communication network are typically buffered temporarily in switches along the route. In networks that employ lossless link-level flow control, a switch typically sends flow control notifications indicative of the switch buffer status to its previous-hop neighbor switch. The previous-hop switch throttles transmission of packets over the link in question based on these notifications. In some practical situations, the buffers of multiple switches interconnected cyclically become full, and consequently, these switches are unable to further send or receive packets. Such an undesired condition is referred to as a "deadlock condition" or simply "deadlock" for brevity.

Some network topologies allow deadlock-free routing. For example, in a network having a tree topology, shortest-path routing is deadlock-free simply because it is by-definition free of loops. Shortest-path routing is important in general for minimal delivery-latency across the network and for efficient bandwidth usage.

In some networks, the switches are arranged in a Cartesian topology such as mesh or torus. In a Cartesian topology switches connect to their neighbors in a virtual grid, and each switch can be identified by respective Cartesian coordinates. In the torus topology, boundary switches of the virtual grid are connected cyclically. A Cartesian topology may have any suitable dimensionality, such as two-dimensional (2D), three-dimensional (3D), or a higher dimensionality.

In principle, deadlocks in a Cartesian topology that is not cyclic (e.g., mesh) can be prevented using the Dimension Ordered Routing (DOR) scheme cited above. For cyclic topologies (e.g., torus), a combination of DOR and multiple buffer pools, referred to as Virtual Lanes (VLs), may be used to prevent deadlocks. The routes derived using DOR comprise one or more segments that progress from switch to switch along different respective dimensions of the topology. For example, a route generated by DOR in a 2D Cartesian topology comprises a single segment along the x-axis or y-axis, or two segments, e.g., a segment along the x-axis followed by a segment along the y-axis.

The DOR scheme is inapplicable, however, in certain applications that require routing flexibility. For example, the DOR scheme cannot support adaptive routing because DOR defines a single route for each pair of source and destination switches in the network. In addition, the routes generated by the DOR scheme for mesh topologies (and also in tori topologies if only shortest-path routes are allowed) cannot tolerate even a single faulty or missing switch or inter-switch link in the network.

Embodiments that are described herein provide improved methods and systems for flexible construction of shortest-path and deadlock-free routes in networks having a Cartesian topology. In the disclosed techniques, an order is predefined over the dimensions of the topology, and a route may traverse the dimensions both in order and opposite to the order.

Note that in general deadlock-freedom is a property of multiple routes combined. For example, if all the routes in the network are defined using the DOR scheme, deadlock freedom is guaranteed. If, however, a given route is derived using the DOR scheme, but there are other routes not obeying the DOR scheme, these routes and the DOR-derived route can together create a deadlock condition.

A dimension in a D-dimensional topology can be identified by a respective integer $1 \leq d \leq D$, and an example order of the dimensions may be specified, for example, by the sequence 1 . . . D. In the present context, the term "a route traversing the dimensions in-order" means that consecutive segments of the route traverse along respective topology dimensions in accordance with the predefined order, e.g., from a dimension d to a higher dimension $d'>d$, given the order 1 . . . D. In other words, skipping dimensions along the order is allowed. Similarly, the term "a route traversing the dimensions opposite to the order" means that consecutive segments of the route traverse respective topology dimensions in an order opposite to the predefined order, e.g., from a dimension d to a lower dimension $d'<d$, given the order 1 . . . D.

This flexibility in route selection is useful, for example, for constructing routes in a network having faulty switches or links, and for constructing multiple routes for a given pair of source and destination switches to be used in adaptive routing.

In some disclosed techniques, multiple Virtual Lanes (VLs) are used for packets traversing a given route, for preventing deadlocks. Since switches typically support a limited number of VLs, the disclosed embodiments seek preferred routes that require a minimal number of VLs.

In some embodiments, a network-management computer, also referred to as a network manager, connects to the network and is used for configuring the network switches. For configuring the switches, the network manager selects routes between pairs of source and destination switches using a model of the actual network topology. In an embodiment, the network manager starts with a selected destination switch and scans the other switches in a Breadth First Search (BFS) order.

The network manager evaluates for each scanned switch multiple candidate routes to the destination switch. The network manager selects among the candidate routes one or more routes based on a selection criterion that prefers routes containing a minimal number of "opposite turns," i.e., a minimal number of switches in which the route changes from traversal along a given dimension to traversal along a lower dimension. The relation "lower" refers to the pre-defined order set over the dimensions. In the disclosed embodiments, the number of VLs required is directly related to the number of opposite-turns, and therefore the disclosed route selection criterion minimizes the number of VLs.

System Description

FIG. 1 is a block diagram that schematically illustrates a computer system 20, in accordance with an embodiment that is described herein. System 20 comprises multiple host computers 24 which communicate with one another over a network 30 and thus function as network nodes of the network. Network nodes 24 connect to network 30 via respective Network Interface Controllers (NICs) 28. Although in the example of FIG. 1, the computer system comprises seven network nodes 24 denoted NODE_1 . . . NODE 7, a practical computer system may comprise any suitable number of network nodes.

Network 30 may comprise any suitable communication network such as, for example, an InfiniBand (IB) switch fabric, or packet networks of other sorts, such as Ethernet or Internet Protocol (IP) networks. Alternatively, network 30 may operate in accordance with any other suitable standard or protocol.

Network 30 typically comprises multiple network elements 32, which are interconnected via physical links 34 in accordance with some predefined network topology. Network elements 32 may comprise, for example, switches, routers, bridges, gateways, or any other suitable type of network elements. In the present example, network elements 32 comprise switches arranged in a Cartesian topology, such as mesh or torus. Each of network nodes 24 connects to a respective switch in the network, and is able to communicate over the network with all other network nodes. Network 30 may comprise one or more switches that are interconnected to other switches in the network but are not connected to any network node 24. In some practical embodiments, each switch may connect to multiple network nodes.

In some embodiments, network 30 comprises a D-multi-dimensional Cartesian topology. The number of network elements per dimension may be a common across all the dimensions, or alternatively, may vary among different dimensions. The embodiments disclosed herein are applicable to both pristine networks in which all the switches and physical links on the virtual grid are present and function, and also to faulty networks in which at least one switch or physical link is missing or failing.

Network 30 is managed using a central network-management computer, referred to herein as a network manager 36, comprising an interface 28 for connecting to network 30 (e.g., a NIC similar to the one used in the network nodes) and a processor 40. In some other embodiments, network manager 36 may be running atop one of the network nodes 24. The network manager enables a network administrator to setup the network and provision the network elements with routing information via the NIC. Alternatively, at least part of the provisioning is carried out by the network manager automatically.

In some embodiments, network manager 36 is aware of the network topology, i.e., the identities of the network elements and the manner in which they are interconnected, e.g., as configured manually by a network administrator via a suitable interface (not shown). Alternatively or additionally, the network manager learns the network topology automatically by interrogating network elements 32.

Among other tasks, network manager 36 defines routes between pairs of the network elements, based on the network topology, and configures relevant routing information to the network elements belonging to these routes. In some embodiments, network manager 36 defines some order to the topology dimensions, e.g., 1 . . . D, and allows routes that traverse the dimensions in order as well as in opposite order, while still preventing deadlock conditions. By allowing traversing the dimensions in opposite order, the network manager is able to define shortest-path deadlock-free routes for non-pristine topologies and for adaptive routing.

Although in computer system 20 of FIG. 1 network manager 36 is implemented on a dedicated network node, in alternative embodiments, the network manager can be implemented within one of network nodes 24, and executed by a processor of the network node. Further alternatively, at least one of the switches in the network may comprise a "managed switch" attached to a processor, and the network manager (or part thereof) may reside on the managed switch.

FIG. 2 is a block diagram that schematically illustrates network switch 32, in accordance with an embodiment that is described herein. Although the description that follows refers mainly to a network switch, the disclosed techniques can be used with various other types of network elements.

Switch 32 comprises multiple ports 44 for exchanging data packets with network 30 via physical links 34. In some embodiments, a given port 44 can function as an ingress interface for incoming packets or as an egress interface for outputting packets. Alternatively, a port 44 can function as both ingress and egress interfaces.

Switch 32 comprises a buffer 46, which comprises one or more ingress queues 48 for storing packets arriving from the network via the ingress interfaces of ports 44, and one or more egress queues 52 for storing packets awaiting transmission to the network via the egress interfaces of ports 44. In some embodiments, buffer 46 comprises a shared buffer in which queues of different sizes may be dynamically allocated to different ingress or egress interfaces, or in accordance with any other suitable criterion.

Packets traversing the network may belong to different flows. In some embodiments, physical links 34 in network 30 are each shared by multiple logical communication links, also referred to as virtual channels. In InfiniBand, the virtual channels are also referred to as Virtual Lanes (VLs).

In one embodiment, for supporting multiple VLs, queues 48 and 52 are each divided into multiple logical queues that store the packets in accordance with the VL to which the packets are assigned. Alternatively, each of queues 48 and 52 comprises multiple dedicated queues for the respective VLs. The queues allocated respectively for the VLs are also referred to herein as "virtual buffers."

In an embodiment, switch 32 receives via an ingress interface packets assigned to an input VL value, and replaces this input VL value in the packets headers with a different output VL value before transmitting the packets back to the network via one of the egress interfaces. The mapping from an input VL value to an output VL value is part of the routing information provisioned to the switch by the network manager. In some of the embodiments disclosed below, changing the VL value assigned to a packet traversing the switch is used for preventing deadlock conditions in networks having a Cartesian topology.

Switch 32 comprises a configurable switch fabric 54, which forwards packets between ports 44 in accordance with a certain routing plan. Typically, each packet belongs to a certain flow. By routing a certain flow to a certain port, fabric 54 causes the packets of that flow to be routed over a certain routing path through network 30.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Switch 32 comprises a switch controller 56, which configures fabric 54 to apply the desired routing plan. By controlling the routing plan, switch 32 is able to cause the packets to traverse various routing paths through network 30.

In some embodiments, switch 32 supports adaptive routing by allowing packets received in a given ingress interface to be routed via one of multiple egress interfaces. To re-route a given flow, switch controller selects for the flow packets, which the switch receives via an ingress interface, a different egress interface. Switch 32 may, for example, save the current associations between ingress and egress interfaces in a Forwarding Database (FDB) (not shown in the figure). Alternatively, switch 32 can hold a set of routing rules, e.g., per flow. In some cases, the packets are routed without recording any information for future use.

Forwarding the packets is typically based on certain fields in the packet headers. The fields may include, for example, at least one of the source and destination addresses, the underlying protocol and the source and destination port numbers. In some embodiments, forwarding the packets comprises calculating a hash function over one or more fields in the packet headers, and using the result hash value for selecting a respective egress interface for the packet.

The configurations of system 20, network manager 36 and switch 32 are example configurations, which are chosen purely for the sake of conceptual clarity. In alternative embodiments, any other suitable configurations can also be used. The different elements of network manager 36 and switch 32 may be implemented in hardware, such as using one or more Application-Specific Integrated Circuits (ASICs) or Field-Programmable Gate Arrays (FPGAs). In alternative embodiments, some elements of network manager 36 and/or switch 32, e.g., processor 40 and/or switch controller 56, may be implemented in software executing on a suitable processor, or using a combination of hardware and software elements.

In some embodiments, processor 40 and/or switch controller 56 may comprise general-purpose processors, which are programmed in software to carry out the network manager and/or switch functions described herein. The software may be downloaded to the processors in electronic form, over a network, for example, or it may, alternatively or additionally, be provided and/or stored on non-transitory tangible media, such as magnetic, optical, or electronic memory.

Routing in Cartesian Topologies

A route between two network elements may comprise one or more route segments. In the present context, the term "route segment," or simply "segment," for brevity, means a route or part of a route traversing two or more consecutive switches along one dimension. A segment between neighbor switches is also referred to herein as a "hop."

In mesh and torus topologies, routes constructed by the DOR scheme, for example, may comprise a single segment in any of the topology dimensions, or multiple segments concatenated in accordance with a predefined order of the dimensions, wherein each of the segments traverses a different respective dimension.

FIG. 3 is a diagram that schematically illustrates network 30 configured in a 2D mesh or torus topology, in which multiple alternative routes connect between selected source and destination switches, in accordance with an embodiment that is described herein.

The example network in FIG. 3 comprises sixteen switches 32 arranged in a Cartesian topology, wherein the links interconnecting the switches (such as physical links 34 in FIG. 1) are omitted, for clarity. Network nodes 24A and 24B communicate with one other over the network by connecting to a source switch 32A and to a destination switch 32B, respectively. Consider the communication direction from node 24A to node 24B. In this direction, packets sent by node 24A are routed by switch 32A to traverse multiple other switches in the network toward destination switch 32B, which routes the packets to node 24B.

Between switches 32A and 32B, the packets may traverse other switches along one of several alternative routes. For example, a route 70 from switch 32A to 32B comprises hops 70A and 70B along the x-axis and hops 70C and 70D along the y-axis. Route 70 is a shortest-path route from switch 32A to switch 32B, comprising four hops. Note that route 70 first traverses a segment along the x-axis and then another segment along the y-axis, as required by the DOR scheme.

In addition to route 70, FIG. 3 depicts alternative routes 74 and 78 from switch 32A to 32B. Route 74 comprises six hops denoted 74A . . . 74F, and route 78 comprises four hops denoted 78A . . . 78D and is therefore a shortest-path route. Note that none of routes 74 and 78 could be generated by the DOR scheme, because each of these routes includes two non-concatenated segments that belong to the same dimension. Route 74 may be used, for example, when the link of hop 70A or switch 32C fails, although in the present example, route 74 is not a shortest-path route. Route 78 may be used, for example, when both switches 32C and 32D fail.

A multi-segment route may traverse along one or more topology dimensions. Consider, for example, a D-dimensional Cartesian topology, in which the dimensions are ordered by their respective indices 1 . . . D. In DOR, for example, each route traverses the topology dimensions by their order, i.e., a dimension $1 \leq d \leq D$ is followed by the next dimension in order, (d+1) or generally a higher dimension in the order d'>d. In the disclosed embodiments, this constraint is relaxed, and valid routes may traverse dimensions in a reverse order relative to the order of the topology dimensions.

In the description that follows, the term "in-order-turn" refers to a traversal from a given dimension to a higher dimension in order, e.g., from a dimension d to (d+1) or generally to d'>d. Similarly, the term "opposite-order-turn" (or just "opposite-turn") refers to a traversal from a given dimension to a dimension lower in the order of topology dimensions, e.g., from a dimension d to (d−1) or generally to d'<d.

In a 2D topology, and assuming an x-to-y order of topology dimensions, an in-order turn refers to a dimension traversal from the x-axis to the y-axis, whereas an opposite-turn refers to a dimension traversal from the y-axis to the x-axis.

In FIG. 3, in-order and opposite-order turns are depicted as 90-degree arrows 82 and 86, respectively. For example, route 70 has a single in-order turn 82B, route 74 has one opposite-order turn 86A and one in-order-turn 82A, and route 78 has two opposite-order turns 86B and 86C.

Allowing both in-order and opposite-order turns may result in routes that together create a deadlock condition. As will be described in detail below, deadlocks in routes that contain opposite-order turns can be avoided by routing the packets to a different VL upon traversing an opposite-turn. It can be shown that the number of VLs required for preventing all deadlocks in a Cartesian (e.g., mesh or torus) topology depends on the maximal number of opposite-turns along the routes.

Constructing Deadlock-Free Routes in Cartesian Topologies

Next we describe methods for constructing shortest-path deadlock-free routes in a network having a Cartesian topology. For a given topology, multiple route candidates are examined, and a route having the minimal number of opposite-turns is selected. The selected route also requires the minimal number of VLs. Other selection criteria such as shortest-path selection can also be imposed.

Figure 4:
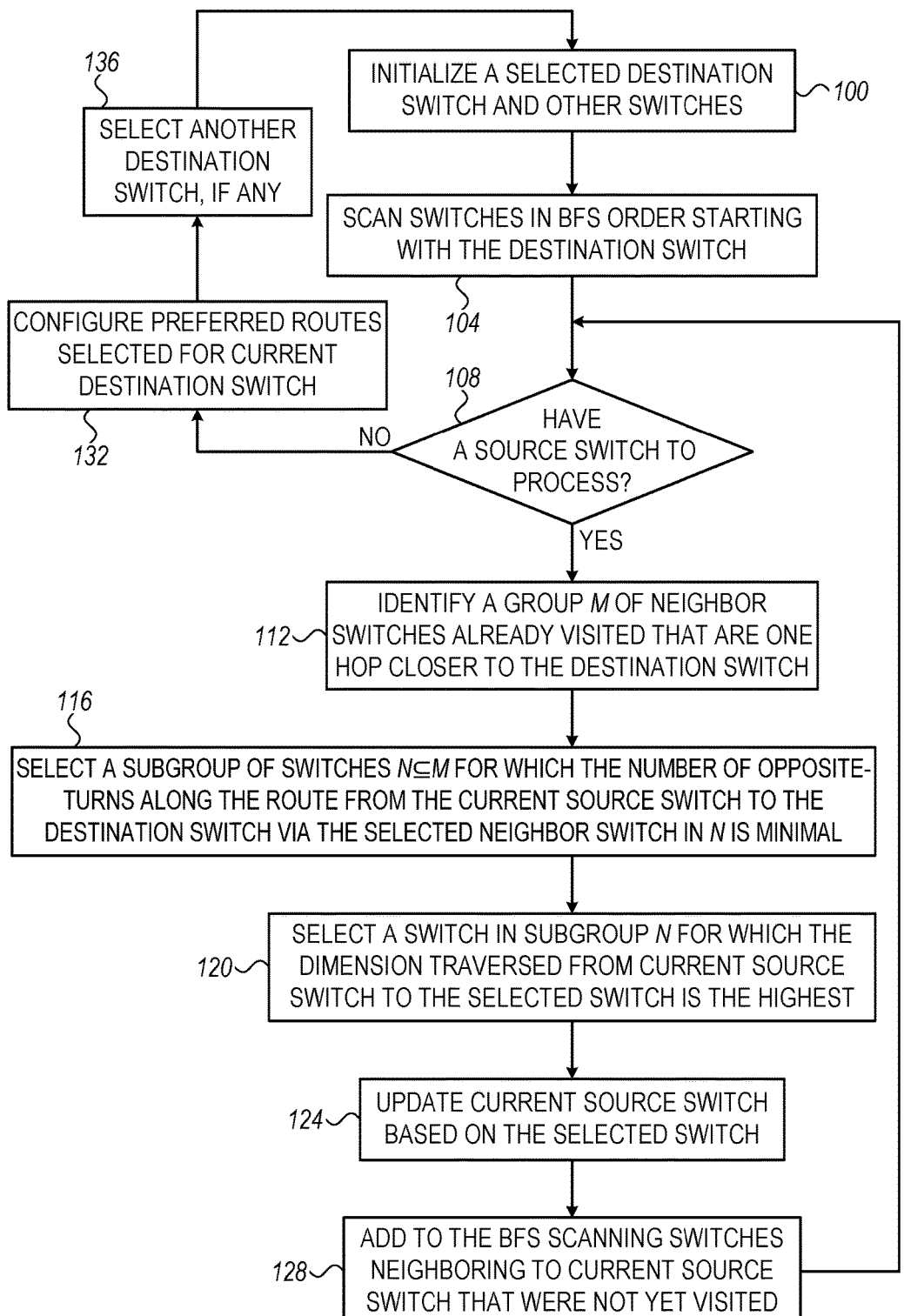
FIG. 4 is a flow chart that schematically illustrates a method for constructing routes in a Cartesian topology, in accordance with an embodiment that is described herein.

FIG. 4 is a flow chart that schematically illustrates a method for constructing preferred routes in a Cartesian topology, in accordance with an embodiment that is described herein. The method is described as being executed by processor 40 of network manager 36. We assume that processor 40 models the network topology as a group of multiple vertices that are interconnected via edges in accordance with the actual network topology. Using this model, the vertices correspond to respective switches 32, and the edges correspond to respective links 34 of network 30.

In some embodiments, selecting a preferred route from a source switch to a destination switch is based on the following selection criteria:
- Select routes having a minimal number of opposite-turs (and therefore also a minimal number of VLs).
- Select shortest-path routes.
- Select routes traversing high dimensions, because a route merged with another route by traversing to a high dimension is less likely to traverse an opposite-turn.

In some embodiments, all the three selection criteria above are used as a combined criterion. In alternative embodiments, one or both of the second and third criteria may be omitted.

In describing the method, S denotes the group of all switches 32 in the network, s denotes a source switch and $s^d$ denotes a destination switch for s. In constructing routes, the network manager characterizes the switches using the following attributes:
- s.dist—the distance from s to $s^d$. Each hop increases the distance by a single distance unit.
- s.hopDim—the dimension traversed between s and the next-hop switch toward $s^d$.
- s.pinc—the number of opposite-turns along the route from s to $s^d$.

Additional definitions include:
- adj(s)—denotes the group of neighbor switches to s.
- s→t denotes a hop traversing from switch s to a neighbor switch t.
- dim(s→t) denotes the dimension traversed in hop s→t.
- The Boolean expression [dim(s→t)>t.hopDim)] equals 1 if traversing from s to t results in an opposite-turn, and 0 otherwise.
- Q(s) denotes a queue of switches to be processed. Q(s) operates in a First-In First-Out (FIFO) order, using an operator Q.push(s) for adding a switch s to the queue end, and an operator Q.pop( ) for popping a switch out of the queue.

The method begins with processor 40 selecting a destination switch $s^d$ among the network switches in S, and initializing $s^d$, at an initialization step 100. Processor 40 may select the destination switch among the switches in S sequentially, or using any other selection criteria. To initialize $s^d$, the processor sets the switch attributes as follows:

$$\begin{cases} s^d \cdot dist = 0 \\ s^d \cdot pinc = 0 \\ s^d \cdot hopDim = \infty \end{cases} \quad \text{Equation 1}$$

In Equation 1, the symbol ∞ can be implemented as an integer larger than the number of topology dimensions. Further at step 100, the processor initializes the other switches in the network as given by:

$$\forall s \neq s^d \in S: s.dist = \infty \quad \text{Equation 2:}$$

In Equation 2, the symbol ∞ can be implemented as an integer larger than the length of the longest route in the network. At a BFS scanning step 104, the processor sets a unity distance to the distance attribute of the neighbor switches of $s^d$, and pushes the neighbor switches into the BFS queue as given by:

$$\forall s \in adj(s^d): s.dist = 1, Q.push(s) \quad \text{Equation 3:}$$

At a queue checking step 108, the processor checks whether there are any switches queued for processing, and if so, the processor pops a switch s' from the BFS queue and proceeds to a neighbor identification step 112.

At step 112, the processor identifies for switch s' neighbor switches t that were already visited by the BSF scanning. As such, a route to the destination switch was already selected for each of these neighbor switches that is one hop closer to $s^d$ than s'. The group of switches identified at step 112 is denoted M(s') and is given by:

$$M(s') = \{t : t \in adj(s') \wedge t.dist = s'.dist - 1\} \quad \text{Equation 4:}$$

Note that in selecting preferred routes using M(s') as defined in Equation 4, the processor refrains from evaluating candidate routes in which at least one of the switches, or a physical link connecting two of the switches along the candidate route, is missing from the Cartesian topology or malfunctions, because such a switch or link does not exist in the topology or fails to satisfy the condition t.dist=s'.dist−1 in Equation 4.

At a subgroup selection step 116, the processor selects a subgroup N(s') comprising one or more of the neighbor switches in M(s') so that the route from s' to $s^d$ via the switch in N(s') has a minimal number of opposite-turns. To this end, for each switch t in M(s'), the processor evaluates the resulting number of opposite-turns as:

$$pinc(s',t) = t.pinc + [dim(s' \to t) > t.hopDim] \quad \text{Equation 5:}$$

and identifies those switches t resulting in the minimal number of opposite-turns along the route to the destination switch:

$$N(s') = \{t : t \in M(s') \wedge pinc(s',t) = \min_{u \in M(s')} pinc(s',u)\} \quad \text{Equation 6:}$$

For each switch t in N(s') the route from s' to $s^d$ via t is a route candidate that is shortest-path and has the minimal number of opposite-turns.

At a maximal dimension selection step 120, the processor selects a switch r in N(s') for which the traversed dimension, i.e., dim(s'→r) is maximal in the order of topology dimensions, as given by:

select $r \in N(s')$, such that $\dim(s' \to r) = \max_{t \in N(s')} \dim(s' \to t)$  Equation 7:

The selection in Equation 7 is designed to reduce the number of opposite-turn in subsequently selected routes via s', because of the high-valued dim(s'→r).

At an updating step 124, the processor updates the attributes of the switch s' in accordance with the attributes of the switch r selected at step 120 as follows:

$$\begin{cases} s' \cdot pinc = pinc(s', r) \\ s' \cdot hopDim = dim(s', r) \end{cases}$$  Equation 8

At a BSF queuing step 128, the processor pushes to the BFS queue neighbors of s' that were not yet processed, as given by:

$\forall t \in adj(s'), t.\text{dist}=\infty: Q.\text{push}(t)$  Equation 9:

In Equation 9, the symbol ∞ can be implemented as described in Equation 2 above. Following step 128, the processor loops back to step 108, to check the occupancy of the BFS queue, and to processes subsequent queue entries, if any.

If at step 108, the BFS queue is empty, the processor proceeds to a route configuration step 132, in which the processor configures the switches comprised in the routes selected for the current destination switch. For example, the processor configures relevant routing information within switch fabric 54 of the relevant switches. In addition, the processor configures the relevant switches with the maximal number of opposite-turns in the selected routes or equivalently with the number of VLs required to be allocated to prevent deadlock conditions. Further additionally, the processor configures the relevant switches with VL management rules described further below.

At a destination switch re-selection step 136, the processor selects a subsequent destination switch in the network, and loops back to step 100 to construct preferred routes toward the selected destination switch. When all the network switches have been scanned as destination switches at step 136, the method terminates.

VL Management

As described above, network manager 36 selects for some or all pairs of source and destination switches in network 30 a respective shortest-path route having the minimal number of opposite-turns (or VLs).

Let nOT denote the minimal number of opposite-turns across all the routes, and let nVL denote the number of VL required to prevent deadlocks. In some embodiments, the minimal number of VLs required is an integer multiple of the number of opposite-turns, i.e., nVL=A·nOT, wherein A>0 is a positive integer. In an embodiment, for a mesh topology A=1, i.e., nVL=nOT, and for a torus topology A=2, i.e., nVL=2·nOT.

Table 1, depicts VL management rules carried out within a switch in a mesh topology, in an embodiment. In this embodiment, packets injected into the network are assigned VL=0, and the VL value is increased when the packet traverses an opposite-turn. In this embodiment, VL gets integer indices between 0 and nOT−1.

TABLE 1

VL management rules in mesh topology

| | | |
|---|---|---|
| VL range | $0 \leq i < nOT$, VLmax = nOT − 1 | |
| Packet injected into network | VL = 0 | |
| Turn type | From VL | To VL |
| in-order-turn | VL = i | VL = i |
| opposite-turn | VL = i | VL = i + 1 |

Table 2, depicts VL management rules carried out within a switch in a torus topology, in an embodiment. Similarly to the mesh topology, packets injected into the network are assigned VL=0. In the torus topology, however, VL has two possible values for resolving deadlock along a cyclic grid line. Specifically, when crossing a dateline, the VL value increases from VL=2i to VL=2i+1. In torus topology, we assume that datelines are predefined for the cyclic routes along the grid lines of the virtual grid, wherein each dateline is typically defined as a crossing point between two switches closing the cyclic grid line. For example, let X>3 denote the number of switches along a dimension. The dateline is crossed when a packet traverses between switches having coordinates 0 and (X−1). In addition, when traversing an in-order-turn the VL value remains VL=2i or changes from VL=2i+1 to VL=2i. For an opposite-turn, the VL value changes from VL=2i or VL=2i+1 to VL=2(i+1).

TABLE 2

VL management rules in torus topology

| | | |
|---|---|---|
| VL range | $0 \leq i < nOT$, VLmax = 2nOT − 1 | |
| Packet injected into network | VL = 0 | |
| Traversing type | From VL | To VL |
| crossing a dateline | VL = 2i | VL = 2i + 1 |
| in-order-turn | VL = 2i | VL = 2i |
| | VL = 2i + 1 | VL = 2i |
| opposite-turn | VL = 2i | VL = 2(i + 1) |
| | VL = 2i + 1 | VL = 2(i + 1) |

Table 3, depicts VL indices assigned to packets traversing routes 70, 74 and 78 of FIG. 2 above, in accordance with the VL management rules of Tables 1 and 2. Table 3 refers to a mesh topology and to a torus topology without crossing a dateline.

TABLE 3

Applying the VL management to the routes in FIG. 2

| | ROUTE 70 | | | ROUTE 74 | | | ROUTE 78 | |
|---|---|---|---|---|---|---|---|---|
| HOP | Mesh | Torus | HOP | Mesh | Torus | HOP | Mesh | Torus |
| 70A | VL = 0 | VL = 0 | 74A | VL = 0 | VL = 0 | 78A | VL = 0 | VL = 0 |
| 70B | VL = 0 | VL = 0 | 74B | VL = 1 | VL = 2 | 78B | VL = 1 | VL = 2 |
| 70C | VL = 0 | VL = 0 | 74C | VL = 1 | VL = 2 | 78C | VL = 1 | VL = 2 |
| 70D | VL = 0 | VL = 0 | 74D | VL = 1 | VL = 2 | 78D | VL = 2 | VL = 4 |
| | | | 74E | VL = 1 | VL = 2 | | | |
| | | | 74F | VL = 1 | VL = 2 | | | |

Note that in implementing the method of FIG. 4, selecting the routes is constrained by a VL budget predefined by the processor, i.e., the maximal number of VL available in the switch. For static routing, the worst-case route in the network, in terms of the number of VL required, should satisfy the VL budget.

In adaptive routing, the network switches are configured to route a packet received in a given ingress interface to one of several predefined egress interfaces. The selection of the egress interface is done locally within the switch. In this case, a route from a source switch to a destination switch may be suboptimal, i.e., have a number of opposite-turns larger than the minimal number of opposite-turns possible, if routing a packet along this route does not cause the VL value in the packet to exceed the VL budget.

In some embodiments, to design routing rules that support adaptive routing, the network manager first defines static routes having the minimal number of opposite-turns, as described above, and then defines adaptive routing rules for the switches based on information collected in defining the static routes.

In designing the adaptive routing rules for meeting the VL budget the following factors are considered: (i) the packet's ingress interface and current VL value, (ii) candidate egress interfaces and the p.inc value of the respective neighbor switches, (iii) whether routing via the candidate egress interface creates an opposite-turn, and (iv) whether the switch itself creates an opposite-turn, which depends on the dimension from which the ingress packet arrives. Note that by using the above design constraints, a switch may have different groups of egress interfaces available for adaptive routing, depending on the VL value of the ingress packet.

The embodiments described above are given by example, and other suitable embodiments can also be used. For example, the VL values assigned in the VL management rules in Tables 1 and 2 are not mandatory, and other suitable VL assignments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   a network interface, configured to communicate with a network that comprises a plurality of switches interconnected in a Cartesian topology having multiple dimensions; and
   a processor, configured to:
      predefine an order among the dimensions of the Cartesian topology;
      search for routes via the network from a source switch to a destination switch, by evaluating candidate routes based at least on respective numbers of switches along the candidate routes for which traversal to a next-hop switch changes from one of the dimensions to another of the dimensions opposite to the predefined order, to select multiple routes from the source to the destination having up to a maximal number of next-hop switch changes opposite to the predefined order;
      configure the switches with a number of virtual lanes corresponding to the maximal number of next-hop switch changes opposite to the predefined order; and
      configure the switches in the network to route packets from the source switch to the destination switch along the selected multiple routes preferred route.

2. The apparatus according to claim 1, wherein the processor is configured to configure the switches to allocate a number of virtual buffers per switch that is an integer multiple of a maximal number of the switches for which the traversal changes opposite to the predefined order.

3. The apparatus according to claim 1, wherein the processor is configured to configure the switches to re-associate packets, which are received associated with a given Virtual Lane (VL) and in a next hop begin traversing a different dimension opposite to the predefined order, with a VL different from the given VL.

4. The apparatus according to claim 1, wherein the processor is configured to define adaptive routing rules for the switches by defining for a given ingress interface of the source switch at least two egress interfaces for routing packets from the source switch to the destination switch without exceeding a VL budget of the source switch, and to configure the switches to apply adaptive routing from the source switch to the destination switch using the at least two egress interfaces.

5. The apparatus according to claim 4, wherein the processor is configured to define the at least two egress interfaces by considering an ingress interface and a VL value of an ingress packet, and a number of opposite-turns incurred by routing via each of the two or more egress interfaces and by the source switch.

6. The apparatus according to claim 1, wherein the processor is configured to configure the switches to route packets along the selected multiple routes using adaptive routing.

7. The apparatus according to claim 1, wherein the processor is configured to configure the switches to route packets from the source switch to the destination switch along a preferred route and to use others of the selected multiple routes when a switch or link along the preferred route is faulty.

8. The apparatus according to claim 1, wherein the processor is configured to search for routes that require a minimal number of opposite turns.

9. The apparatus according to claim 1, wherein the processor is configured to search for the routes by traversing the switches of the network beginning from the destination switch in a breadth first search order.

10. The apparatus according to claim 9, wherein the processor is configured in traversing the switches to select next-hop switches for which a candidate route via the selected next-hop switch has a shortest path among neighboring switches.

11. The apparatus according to claim 9, wherein the processor is configured in traversing the switches to select next-hop switches for which a dimension traversed from the source switch is highest in the order among neighboring switches.

12. The apparatus according to claim 9, wherein the processor is configured in traversing the switches to determine for each current switch a number of opposite-turns along a route from the current switch to the destination switch.

13. The apparatus according to claim 12, wherein the processor is configured in traversing the switches to determine for each current switch a distance from the current switch to the destination switch.

14. The apparatus according to claim 9, wherein the processor is configured in traversing the switches to determine for each current switch the dimension traversed between the current switch and a next hop toward the destination switch.

15. A method, comprising:
in a processor communicating with a network that comprises a plurality of switches interconnected in a Cartesian topology having multiple dimensions, predefining an order among the dimensions of the Cartesian topology;
searching, by the processor, for routes via the network from a source switch to a destination switch, by evaluating candidate routes based at least on respective numbers of switches along the candidate routes for which traversal to a next-hop switch changes from one of the dimensions to another of the dimensions opposite to the predefined order, to select multiple routes from the source to the destination having up to a maximal number of next-hop switch changes opposite to the predefined order;
configuring the switches with a number of virtual lanes corresponding to the maximal number of next-hop switch changes opposite to the predefined order; and
configuring the switches in the network to route packets from the source switch to the destination switch along the selected multiple routes.

16. The method according to claim 15, wherein configuring the one or more switches comprises configuring the switches to allocate a number of virtual buffers per switch that is an integer multiple of a maximal number of the switches for which the traversal changes opposite to the predefined order.

17. The method according to claim 15, wherein configuring the one or more switches comprises configuring the switches to re-associate packets, which are received associated with a given Virtual Lane (VL) and in a next hop begin traversing a different dimension opposite to the predefined order, with a VL different from the given VL.

18. The method according to claim 15, and comprising defining adaptive routing rules for the switches by defining for a given ingress interface of the source switch at least two egress interfaces for routing packets from the source switch to the destination switch without exceeding a VL budget of the source switch, and wherein configuring the one or more switches comprises configuring the switches to apply adaptive routing from the source switch to the destination switch using the at least two egress interfaces.

19. The method according to claim 18, wherein defining the at least two egress interfaces comprises defining the at least two egress interfaces with consideration of an ingress interface and a VL value of an ingress packet, and a number of opposite-turns incurred by routing via each of the two or more egress interfaces and by the source switch.

20. The method according to claim 15, wherein searching for the routes comprises traversing the switches of the network beginning from the destination switch in a breadth first search order.

21. The method according to claim 20, wherein traversing the switches comprises selecting the next-hop switches for which a candidate route via the selected next-hop switch has a shortest path among neighboring switches.

22. The method according to claim 20, wherein traversing the switches comprises selecting the next-hop switches for which a dimension traversed from the source switch is highest in the order among the visited neighboring switches.

* * * * *